United States Patent Office 2,735,869
Patented Feb. 21, 1956

2,735,869

PROCESS FOR THE PREPARATION OF HALOMETHYL AROMATIC KETONES

Ludo K. Frevel and John W. Hedelund, Midland, Mich., assignors to The Dow Chemical Company, Midland, Mich., a corporation of Delaware No Drawing. Application June 2, 1952,
Serial No. 291,302

7 Claims. (Cl. 260—592)

This invention relates to certain haloaromatic ketones and more particularly to a process for the manufacture of halomethyl aromatic ketones.

Several methods for the preparation of halomethyl aromatic ketones are known in the art. The Friedel-Crafts reaction, usually employed for preparing alpha-halo-acetophenones, involves condensing a benzene compound with haloacetyl halide in the presence of metal halide catalyst. However, the Friedel-Crafts reaction is costly since it requires large amounts of catalyst, the recovery of which in the anhydrous state is impracticable. Moreover, this reaction is totally unsuitable for the preparation of haloacetophenones from benzene compounds containing reactive nuclear substituents. Even when the substituents are inert to the condensing agent, it is impossible to obtain certain preferred orientations with respect to the haloacetyl group. A process for producing acetophenone by the vapor-phase treatment of vinyl aromatic halohydrins with steam in the presence of basic catalysts is disclosed by Emerson in U. S. Patent 2,394,674. This process, however, removes the beta halogen atom.

The process of the present invention overcomes the objections to the prior art and provides a new, economical, one-step process for the production of halomethyl aromatic ketones, including nuclearly substituted halomethyl aromatic ketones.

According to the invention, dilute nitric acid is reacted with a (1-hydroxy-2-haloethyl)benzene compound of the general formula

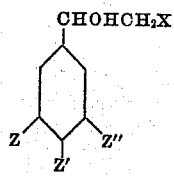

wherein X is a member of the group consisting of bromine and chlorine, and Z, Z', and Z" are independently selected from the group consisting of hydrogen, halogen, alkyl, and alkoxy, each of said alkyl and alkoxy groups containing no more than two carbon atoms.

The halomethyl aromatic ketones prepared according to the process of the invention correspond to the general formula:

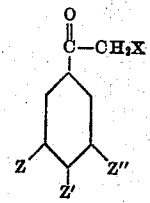

wherein X, Z, Z', and Z" are the same as hereinbefore described. These compounds are useful as intermediates in the preparation of antibiotic pharmaceuticals and industrial chemicals. Some of them are lachrymators and may be used per se in tear gases.

The starting compounds which may be used to produce the ketones of the invention are (1-hydroxy-2-haloethyl) benzene compounds, such as alpha-(bromomethyl)benzyl alcohol ($C_6H_5 \cdot CHOHCH_2Br$) and alpha-(chloromethyl)-benzyl alcohol ($C_6H_5 \cdot CHOHCH_2Cl$). There may also be employed nuclearly substituted (1-hydroxy-2-haloethyl)benzene compounds containing certain ring substituents which are inert to the oxidizing action of aqueous nitric acid, e. g. halogen, alkyl, and alkoxy. Typical substituted starting compounds are: alpha-(bromomethyl)-p-methylbenzyl alcohol (p-$CH_3 \cdot C_6H_4 \cdot CHOHCH_2Br$); alpha-(chloromethyl)-3,5-dimethylbenzyl alcohol $(3,5(CH_3)_2 \cdot C_6H_3 \cdot CHOHCH_2Cl)$ alpha-(chloromethyl)-m-ethylbenzyl alcohol $(m-C_2H_5 \cdot C_6H_4 \cdot CHOHCH_2Cl)$ alpha-(bromomethyl)-m-methoxybenzyl alcohol $(m-CH_3O \cdot C_6H_4 \cdot CHOHCH_2Br)$ alpha-(chloromethyl)-p-ethoxybenzyl alcohol $(p-C_2H_5O \cdot C_6H_4 \cdot CHOHCH_2Cl)$ alpha-(bromomethyl)-p-bromobenzyl alcohol $(p-Br \cdot C_6H_4 \cdot CHOHCH_2Br)$ alpha-(chloromethyl)-m-chlorobenzyl alcohol $(m-Cl \cdot C_6H_4 \cdot CHOHCH_2Cl)$ and alpha-(bromomethyl)-3,5-dichlorobenzyl alcohol $(3,5(Cl)_2 \cdot C_6H_3 \cdot CHOHCH_2Br)$ According to the invention, halomethyl aromatic ketones are produced by the liquid phase oxidation of the above-described (1-hydroxy-2-haloethyl)benzene compounds with aqueous nitric acid. The process is usually carried out batchwise in a reaction vessel resistant to the corrosive action of nitric acid, halogens, and halohydric acids. Nitric acid is added gradually to a refluxing, well-agitated mixture of a (1-hydroxy-2-haloethyl)-benzene compound and water while a stream of an oxygen containing gas, e. g. air, is blown through it. At the preferred conditions of the reaction, the oxidation is readily controlled to give high conversions and yields of the desired ketones.

It has been found highly desirable to charge water into the reaction vessel in an amount from one to several times the weight of the compound to be oxidized. Water is a diluent and dispersing medium for the oxidizing acid and brings it into intimate contact with the compound to be oxidized during the course of the reaction. Water reflux is also a convenient means for limiting the temperature of the reaction to the desired value.

Although (1-hydroxy-2-haloethyl)benzene compounds may be oxidized with nitric acid at temperatures as low as 25° C., the reaction proceeds more rapidly at somewhat higher temperatures. The reaction may conveniently be carried out at the boiling point of the reaction mixture at the ambient pressure, e. g. the temperature of aqueous reflux at or about 100° C. Heating should be terminated when the desired reaction is essentially complete, since prolonged heating beyond this stage causes slow oxidation of the ketones to carboxylic acids.

The process of the invention may also be carried out in the presence of water-immiscible organic solvents such as monochlorobenzene and nitrobenzene which are volatile with steam and inert under the conditions of the reaction. When the compound to be oxidized is a solid at or near the temperature of the reaction, sufficient solvent may be employed to dissolve the organic reactant.

When the compound to be oxidized is normally a solid whose melting point is slightly below the temperature of the reaction, it is generally desirable to add only that small amount of solvent which will steam distill and wash back any solid reactant which might otherwise deposit on condensing surfaces during the initial stages of the reaction.

The nitric acid is usually added gradually throughout the reaction, its rate of addition being governed to control the reaction. It is generally desirable to add at least one half to one mole of nitric acid per mole of the compound to be oxidized. Somewhat larger quantities of acid may be employed but excessively large amounts of acid cause rapid oxidation beyond the desired products of the invention. When water is employed as a diluent as hereinbefore described, commercially available concentrated nitric acid with a specific gravity of about 1.4 is generally used as reagent for the oxidation of (1-hydroxy-2-haloethyl)benzene compounds, although acid of greater or lesser concentrations is suitable. Dilute reagent acid only adds unnecessarily to the bulk and the heat requirements of the reacting mixture.

A stream of oxygen containing gas, such as air, may be blown through the reaction mixture to aid in the oxidation of (1-hydroxy-2-haloethyl)benzene compounds, probably by converting NO back to $NO_2$.

In carrying out the process of the invention, the optimum conditions for the oxidation of any particular starting material may be easily determined by trial.

The organic products may be worked up in several ways, depending upon their identity and that of the organic solvent, if any, employed in the reaction. It is usually desirable to separate the organic layer and wash it with water to remove dissolved acid and water soluble impurities. The reaction products may sometimes be separated from the washed organic layer by fractional distillation, usually at low pressure to offset the thermal instability of these compounds. In other cases, the reaction products are conveniently and more preferably separated by fractional crystallization and purified by recrystallization from organic solvents. The crude filtrate from the fractional crystallization, usually consisting essentially of the (1-hydroxy-2-haloethyl)benzene starting compound, may be fed back to the reaction vessel for further oxidation. In this manner, most of the organic reactant may be converted to the desired product.

Halomethyl aromatic ketones may also be produced by the nitric acid oxidation of (1,2-dihaloethyl)benzene compounds according to the method disclosed in our co-pending application Serial No. 291,301, filed simultaneously herewith.

The present invention is illustrated but not limited, by the following examples.

*Example 1*

Into a two-liter, three-neck flask equipped with reflux condenser, air bubbler tube, dropping funnel, and thermometer was charged 106.5 grams of alpha-(bromomethyl)benzyl alcohol ($C_6H_5 \cdot CHOHCH_2Br$) and 500 ml. of water. Heat was applied to the flask and then air at a rate of about half a liter a minute was bubbled through the reaction mixture. Upon heating the agitated mixture to approximately 100° C., a total of 45 ml. of concentrated nitric acid of 1.42 specific gravity was added dropwise into the reaction vessel during a period of 140 minutes. Following the addition of acid, the heated mixture was blown with air for an additional 310 minutes.

The organic reaction product, after washing with water, weighed 93.5 grams. It was found to contain approximately 40 weight per cent alpha-bromoacetophenone and 60 weight per cent alpha-(bromomethyl)-benzyl alcohol.

*Example 2*

Another example of the oxidation of alpha-(bromomethyl)benzyl alcohol is hereinafter described.

A

The same equipment used in the previous example was charged with approximately 373 grams of alpha-(bromomethyl)benzyl alcohol and 550 ml. of water. A stream of air at a rate of 2 liters a minute was bubbled through the reaction mixture while it was heated to approximately 100° C. During a period of 30 minutes, 70 ml. of nitric acid of 1.42 specific gravity was added dropwise to the agitated mixture. After all the acid had been added, the reaction mixture was heated and blown with air for an additional 150 minutes. The accompanying table contains the approximate weight per cent composition of the organic product weighing 353 grams. The dilute nitric acid layer weighed 643 grams.

B

A portion of the above organic product weighing 342 grams was charged back into the reaction vessel together with 637 grams of dilute nitric acid from the same run. The reaction mixture was heated to approximately 100° C. and 70 ml. of concentrated nitric acid (specific gravity of 1.42) was added during a period of 35 minutes with a stream of air bubbling through the mixture at a rate of 3 liters a minute. Following the addition of acid, the reaction mixture was refluxed and blown with air for an additional short period of time. The organic product weighed 339 grams. The following table contains the weight per cent composition of the organic product.

| | A | B |
|---|---|---|
| | Percent | Percent |
| Alpha-(bromomethyl)benzylalcohol | 71 | 27 |
| Alpha-bromoacetophenone | 29 | 66 |
| Alpha,alpha-dibromoacetophenone | | 7 |

We claim:

1. In a method of preparing a halomethyl aromatic ketone corresponding to the general formula:

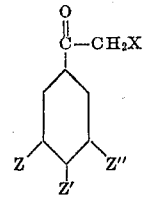

wherein X is a member of the group consisting of bromine and chlorine, and Z, Z', and Z'' are independently selected from the group consisting of hydrogen, bromine, chlorine, alkyl, and alkoxy, each of said alkyl and alkoxy groups containing no more than two carbon atoms, the step which comprises heating with aqueous nitric acid under conditions of good agitation in the liquid phase at a reaction temperature above 25° C., a compound corresponding to the general formula:

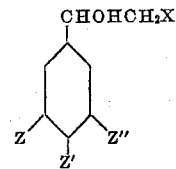

wherein X, Z, Z', and Z'' are as described above, said aqueous nitric acid containing water in an amount at least equal in weight to the initial organic compound with which it is reacted.

2. A method according to claim 1, wherein a stream of an oxygen containing gas is passed through the reacting mixture.

3. In a method of preparing alpha-bromoacetophenone, the step which comprises reacting alpha-(bromomethyl)-benzyl alcohol with at least 0.5 molecular proportion of dilute aqueous nitric acid in the liquid phase under conditions of good agitation at a reaction temperature above 25° C.

4. In a method of preparing alpha-bromoacetophenone, the step which comprises reacting alpha-(bromomethyl)-benzyl alcohol with at least 0.5 molecular proportion of dilute aqueous nitric acid in the liquid phase under conditions of good agitation at a reaction temperature above 25° C. while passing a stream of an oxygen containing gas through the reaction mixture, and thereafter separating alpha-bromoacetophenone from the reaction products.

5. A method according to claim 4 wherein the oxygen containing gas is air.

6. In a method of preparing alpha-bromoacetophenone, the step which comprises reacting alpha-(bromomethyl)-benzyl alcohol with at least 0.5 molecular proportion of dilute aqueous nitric acid in the liquid phase under conditions of good agitation at a temperature of approximately 100° C. while passing a stream of air through the reacting mixture, and thereafter separating alpha-bromoacetophenone from the reaction products.

7. In a method of preparing a halomethyl aromatic ketone corresponding to the general formula:

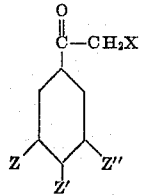

wherein X is a member of the group consisting of bromine and chlorine, and Z, Z', and Z'' are independently selected from the group consisting of hydrogen, bromine, chlorine, alkyl, and alkoxy, each of said alkyl and alkoxy groups containing no more than two carbon atoms, the step which comprises heating in the presence of water in the liquid phase under conditions of good agitation at a reaction temperature above 25° C., a compound corresponding to the general formula:

$$\underset{Z'}{\underset{Z\diagdown\diagup Z''}{\bigcirc}}\text{CHOHCH}_2\text{X}$$

wherein X, Z, Z', and Z'' are as described above, and gradually adding at least 0.5 molecular proportion of aqueous nitric acid of such dilution that the weight of water in the product mixture is at least equal in weight to that of the initial organic compound.

References Cited in the file of this patent

Detoeuf: "Bulletin Soc. Chem. de France," 4th Series (1922), vol. 31, page 177.

Tronov et al.: "Chem. Abstracts," vol. 22 (1928), page 3335, 6. Abstracted from J. Russ. Phys.-Chem. Soc., vol. 59 (1927), pp. 1149–56.

Weygand: "Organic Preparations," (1945), pp. 146–147; Interscience Publication, New York.

Degering: "An Outline of Organic Chemistry" (1947), p. 48; Barnes & Noble, New York, Publisher.